Patented Oct. 17, 1939

2,176,834

UNITED STATES PATENT OFFICE 2,176,834

AROMATIC ALIPHATIC ETHER CHLORIDES AND PROCESS

Herman A. Bruson, Philadelphia, Pa., assignor to Röhm & Haas Company, Philadelphia, Pa.

No Drawing. Application March 29, 1938, Serial No. 198,696

16 Claims. (Cl. 260—613)

This invention relates to a process for preparing complex aryl polyalkylene ether chlorides and aryloxy alkyl chlorides in which the aryl radical also carries a cycloaliphatic substituent. It relates more particularly to a process whereby an aryl polyalkylene ether chloride or an aryloxy alkyl chloride is condensed with a cycloaliphatic compound containing an olefine linkage or an alcoholic hydroxyl group in the presence of a surface-active siliceous clay as a catalyst. It relates further to certain new compounds of this general description.

It is known that unsaturated compounds containing olefinic linkages, or alcohols, can be condensed with aryl polyalkylene halides by means of catalysts of the Friedel-Craft type as is described in the co-pending application of Bruson and Eastes, Serial No. 140,453, filed May 3, 1937. It is also known that compounds of similar type have been prepared by heating the substituted phenol with a dichloro ether in the presence of an alkali as shown by Bruson, U. S. Patents Nos. 2,097,441 and 2,098,203. Similar condensations between alcohols or olefines and aryloxy aliphatic compounds have also been brought about by means of anhydrous zinc chloride or concentrated sulfuric acid.

These processes all have certain disadvantages which it is desirable to overcome. When working with acidic condensing agents, it is necessary to provide acid-proof apparatus and this is particularly true in the case of the Friedel-Craft type of catalyst. Zinc chloride destroys the aryl polyalkylene ether chloride when the temperature is raised to the point at which reaction takes place and sulfuric acid tends to polymerize many cycloaliphatic compounds, particularly those of the terpenic type, thus greatly reducing the yield of the desired condensation product.

It has now been found that condensations of this type can be brought about in a simple and efficient manner by heating the reactants in the presence of certain clays which act as catalysts to cause the elimination of water in case one of the reactants is an alcohol or to cause the aryloxy alkylene chloride to combine with an unsaturated compound containing an olefine linkage. This reaction was entirely unexpected since siliceous clays at high temperatures ordinarily decompose or rearrange ethers and one would expect complete break-down of aryloxy alkylene halides.

The clays which are most effective for the purpose of the present invention are primarily aluminum hydrosilicates which may contain combined magnesium, calcium, iron, titanium, or other oxides. Many of these have a high absorptive capacity for the coloring matter in mineral oils and are known, therefore, as bleaching clays. Fuller's earth and bentonite belong to this class and are suitable for the purposes of the present invention. Before use, they are preferably washed with acid and dried at a temperature not over 150° C. In addition to these, there are many clays marketed under registered trade-marks which are also very suitable. These may be purchased on the open market under the names "Tonsil", "Atapulgas", "Floridin", "Terrana" or "Frankonite." These clays are of particular value as catalysts for the herein described reactions when one of the ingredients is a sensitive olefine or alcohol such as terpenes and terpenic alcohols which are generally decomposed or polymerized to a large extent by Friedel-Craft catalysts.

The aryl polyalkylene ether chlorides and the aryloxy alkyl chlorides which may be used in the process have the general formula

R'—(O—A)$_n$Cl in which R' is an aryl nucleus such as benzene, naphthalene, phenanthrene, anthracene, etc., and which may contain other substituents which are inert in the process such as halogen atoms, hydroxy, alkoxy, aryloxy, hydrocarbon or acyl groups provided, of course, that the nucleus has at least one hydrogen atom available for reaction with the cycloaliphatic compound, A represents an alkylene group containing at least two carbon atoms which may be a straight or branched chain, or a polyalkylene ether radical in which the alkylene groups contain at least two carbon atoms and $n$ is an integer less than 8.

Typical ethers which may be used are those of the following formulas:

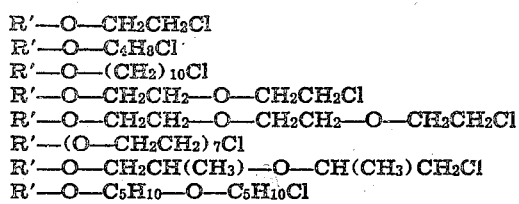

R'—O—CH$_2$CH$_2$Cl
R'—O—C$_4$H$_8$Cl
R'—O—(CH$_2$)$_{10}$Cl
R'—O—CH$_2$CH$_2$—O—CH$_2$CH$_2$Cl
R'—O—CH$_2$CH$_2$—O—CH$_2$CH$_2$—O—CH$_2$CH$_2$Cl
R'—(O—CH$_2$CH$_2$)$_7$Cl
R'—O—CH$_2$CH(CH$_3$)—O—CH(CH$_3$)CH$_2$Cl
R'—O—C$_5$H$_{10}$—O—C$_5$H$_{10}$Cl and higher homologues. R' may be any aryl groups such as phenyl, naphthyl, phenanthryl, anthracyl, etc., and these groups may have other substituents as pointed out above.

The cycloaliphatic compounds which can be condensed with the ether chlorides described above are those which contain at least one olefinic double bond or at least one alcoholic hydroxyl group or both a double bond and a hydroxyl group.

Typical alcohols are those of terpenic character such as borneol, isoborneol, menthol, α-terpineol, fenchol, etc. and these may be of the single or bridged ring type; cyclohexanol and its derivatives which have nuclear substituents such as alkyl, aryl, alkoxy groups, halogen, for example p-sec. butyl-cyclohexanol, p-ter. octyl cyclohexanol, lauryl cyclohexanol, methyl cyclohexanol, camphyl cyclohexanol, p-cyclopentyl cyclohexanol; naphthenic alcohols, abietinol, tetrahydro abietinol, etc.

Typical compounds containing a double bond which may be used are pinene, dipentene, menthene, terpinene, camphene, indene, cyclohexene, lauryl-, octyl-, butyl- etc. cyclohexenes, limonene, fenchene, bornylene, etc. These compounds may also have inert substituents such as alkyl, carboxy, carboxylalkyl groups etc., rosin, abietic or pimaric acid being typical of an unsaturated cycloaliphatic carboxylic acid.

The reaction is carried out in general by heating a mixture of the complex ether chloride and the cycloaliphatic compound in the presence of the surface-active siliceous clay to temperatures above 150° C., preferably 180° to 210° C. at ordinary pressure or in an autoclave, depending on the volatility of the reactants and product. When a cycloaliphatic alcohol is one of the reactants, water is evolved and this preferably should be removed from the reaction mixture as fast as it is formed. This can be done by heating under a reflux condenser equipped with a water trap. The elimination of the water may be facilitated by carrying out the reaction in the presence of a solvent which does not take part in the reaction and which boils between about 150° and 250° C. The saturated cycloaliphatic hydrocarbons such as decaline and saturated petroleum fractions having the proper boiling range are suitable for the purpose. The amount of clay used is usually 10% to 20% by weight calculated on the combined weight of the reactants. More or less can be used if desired but the above amount gives satisfactory results. After the condensation is complete, the clay is filtered off and the product purified by fractional distillation, preferably under reduced pressure.

The following examples will serve to illustrate the invention which, however, is not limited to the exact reactants, clays, temperatures and other conditions of operation shown as it may be otherwise practiced within the scope of the appended claims.

EXAMPLE 1

β-camphylphenoxy-β'-chlorodiethyl ether

A mixture consisting of 154 g. of borneol, 250 g. of β-phenoxy-β'-chlorodiethyl ether, and 40 g. of an acidic siliceous clay, known as "Tonsil" (registered trade-mark) was placed in a vessel equipped with an efficient stirrer, a thermometer, and a reflux condenser attached to a water trap. The mixture was stirred vigorously and heated gradually to about 150° C. during a period of two hours, in which time the water which formed and distilled over was collected in the trap and drawn off while any organic liquid was returned to the reaction vessel. The temperature was then raised during one-half hour to 170° C. and maintained at about 160° to 170° C. for two additional hours. The reaction mixture was then filtered by suction while still hot to remove the clay and the clear filtrate subjected to fractional distillation in vacuo. The fraction boiling below 195° C./1 mm. was recovered to be used over again. The fraction boiling at 205°–220° C./1–2 mm. was collected as β-camphylphenoxy-β'-chlorodiethyl ether.

Camphyl—$C_6H_4$—O—$CH_2CH_2$—O—$CH_2CH_2Cl$

in a yield equal to 120 g. A small quantity of higher boiling material is obtained which is probably a polycamphyl derivative mixed with polymers of camphene, which is formed as the intermediate olefine in the reaction.

In place of the borneol, a molecularly equivalent quantity of camphene can be employed in the reaction at 200° C. The products have the formula $C_{10}H_{17}$—$C_6H_4$—O—$CH_2CH_2$—O—$CH_2CH_2Cl$

Other cycloaliphatic alcohols, such as fenchol, isoborneol, naphthenic alcohol, menthol, and hydrogenated abietinol can be used, mol for mol, in place of borneol to yield the corresponding nuclear cycloaliphatic substituted phenoxyethoxyethyl chlorides, which are pale yellow oils.

Example 2.—A mixture consisting of 136 g. of rectified turpentine (consisting mostly of pinene), 220 g. of β-phenoxy-β'-chlorodiethyl ether, and 35 g. of Tonsil clay was heated at 50° to 55° C. for one hour and finally for five hours at 150° C. with vigorous agitation under a reflux condenser. The cooled, filtered oil was then distilled in vacuo. The fraction boiling at 200°–300° C./1 mm. was a pale yellow oil containing 7.2% chlorine, indicating that the turpentine had combined with the aromatic nucleus of the chloroether to form a mixture of mono- and polyterpenephenoxyethoxyethyl chlorides. Dipentene gave a similar product.

Example 3.—A mixture consisting of 75 g. of methyl abietate, 100 g. of β-phenoxy-β'-chlorodiethyl ether, and 17 g. of Tonsil clay was stirred and heated under a reflux condenser for four hours at 190° to 195° C. The product was filtered and the unchanged reactants removed by distillation in vacuo until the vapor temperature reached 220° C. at 2 mm. pressure. The viscous material remaining contained 6% chlorine (theory 6.9% chlorine).

The resulting product is an ester of a substituted abietic acid, the substituent being a chloroethoxyethoxy phenyl group. This ester may be saponified by heating with alkalies to form the salts from which the free acid can be liberated by treatment with an inorganic acid. This acid can then be converted into any of its esters or salts of organic or inorganic bases.

Such compounds have the general formula $Cl(A—O)_n$—R'Y—COOM

in which A, n and R' have the values given above, Y is a cycloaliphatic radical and M is hydrogen, an ester-forming group or a salt-forming group or a metal.

Example 4.—A mixture, consisting of 98 g. of β-chloroethyl phenyl ether, 77 g. of borneol, and 20 g. of Tonsil clay, was heated with stirring for one and one-half hours at 137° to 185° C. during which time 5 cc. of water distilled over and was separated. The mixture was stirred, heated four hours longer at 183° to 185° and filtered from the clay. The product $C_{10}H_{17}$—$C_6H_4$—$OCH_2CH_2Cl$ was a pale yellow oil boiling at 185°–200° C./1 mm.

Example 5.—A mixture consisting of 154 g. of borneol, 300 g. of β-phenoxyethoxy-β'-chlorodiethyl ether and 45 g. of Tonsil clay was heated under reflux while stirring, so that the water evolved was not allowed to run back into the reaction vessel. The temperature was held at 170° C. for three hours. The filtered oil was distilled in vacuo.

β-camphylphenoxyethoxy-β'-chlorodiethyl ether distilled over at 247°–263° C./4 mm. as a pale yellow oil.

Instead of borneol, fenchol or camphene may be used to give the corresponding fenchyl or camphyl compound as a pale yellow oil. These compounds have the general formula $C_{10}H_{17}-C_6H_4-O-CH_2CH_2-O-CH_2CH_2-O-CH_2CH_2Cl$ in which $C_{10}H_{17}$ is a terpenic group.

The cycloaliphatic aryl alkyl ether chlorides and the cycloaliphatic aryl polyalkylene ether chlorides described herein are useful intermediates for preparing water-soluble capillary-active compounds. For example, the aromatic ring may be sulfonated to yield water-soluble sulfonic acids which along with their water-soluble salts or organic or inorganic bases are good wetting, cleansing, dispersing and emulsifying agents. The terminal chlorine atom may be replaced by an $-SO_3Na$ group as is described in my co-pending application Serial No. 187,158, filed January 27, 1938, by heating the complex ether chloride with aqueous sodium sulfite. The free sulfonic acid can be prepared from the sodium salt and can be converted into other salts of organic or inorganic bases.

The complex aryl ether halides also react with ammonia, primary, secondary or tertiary amines which may contain sulfonic or carboxylic acid groups, whereby the $R-R'(O-A)_n-$ group is attached to the nitrogen atom and forms amines or quaternary ammonium salts.

Thio ethers may be prepared by heating the complex ether with sodium sulfide and the mercaptans by heating with sodium hydrosulfide. Aqueous caustic soda at high temperatures will replace the chlorine atom with a hydroxyl group. By heating the complex ether chlorides with an alcohol $X-OH$ and an alkali, the chlorine atom is removed and the ether $R-R'-(O-A)_n-OX$ is formed.

All of the derivatives and further reaction products of the complex ether chlorides are also very useful for preparing capillary active substances which are good wetting, cleansing, dispersing and emulsifying agents.

In the foregoing description the complex ether chlorides have been used as illustrations. It is, of course, possible to carry out the same reactions with the corresponding bromides and iodides.

I claim:

1. The compound having the formula $C_{10}H_{17}-C_6H_4-O-CH_2CH_2-O-CH_2CH_2-O-CH_2CH_2Cl$ in which $C_{10}H_{17}$ is a terpenic hydrocarbon radical.

2. The compound having the formula $C_{10}H_{17}-C_6H_4-O-CH_2CH_2-O-CH_2CHCl$ in which $C_{10}H_{17}$ is a terpenic hydrocarbon radical.

3. Compounds of the formula $C_{10}H_{17}-R'-O-CH_2CH_2-O-CH_2CH_2-O-CH_2CH_2Cl$ in which R' is a nucleus of the benzene series and $C_{10}H_{17}$ is a terpenic hydrocarbon radical.

4. Compounds of the formula $C_{10}H_{17}-R'-O-CH_2CH_2-O-CH_2CH_2Cl$ in which R' is a nucleus of the benzene series and $C_{10}H_{17}$ is a terpenic hydrocarbon radical.

5. Compounds of the formula $C_{10}H_{17}-R'-O-CH_2CH_2-O-CH_2CH_2-O-CH_2CH_2Cl$ in which R' is an aryl nucleus and $C_{10}H_{17}$ is a terpenic hydrocarbon radical.

6. Compounds of the formula $C_{10}H_{17}-R'-O-CH_2CH_2-O-CH_2CH_2Cl$ in which R' is an aryl nucleus and $C_{10}H_{17}$ is a terpenic hydrocarbon radical.

7. Compounds of the general formula $R-R'-(O-A)_nCl$ in which R is a terpenic hydrocarbon radical, R' is an aryl nucleus, A is selected from the group consisting of alkylene radicals containing at least two carbon atoms and polyalkylene ether radicals containing at least two carbon atoms in each alkylene group and $n$ is an integer less than 8.

8. Compounds having in their acidic form the general formula $Cl(A-O)_n-R'Y-COOH$ in which R' is an aryl radical, A is selected from the group consisting of alkylene radicals containing at least two carbon atoms and polyalkylene ether radicals containing at least two carbon atoms in each alkylene group, $n$ is an integer less than 8, Y is a cycloaliphatic radical.

9. Compounds of the general formula $R-R'-(O-A)_nCl$ in which R is a cycloaliphatic radical, R' is an aryl nucleus, A is selected from the group consisting of alkylene radicals containing at least two carbon atoms and polyalkylene ether radicals containing at least two carbon atoms in each alkylene group and $n$ is an integer less than 8.

10. The process of preparing the compound having the formula $C_{10}H_{17}-C_6H_4-O-CH_2CH_2-O-CH_2CH_2-O-CH_2CH_2Cl$ which comprises condensing borneol with β-phenoxyethoxy-β'-chlorodiethyl ether in the presence of a surface-active siliceous clay catalyst.

11. The process of preparing the compound having the formula $C_{10}H_{17}-C_6H_4-O-CH_2CH_2-O-CH_2CH_2Cl$ which comprises condensing borneol with β-phenoxy-β'-chlorodiethyl ether in the presence of a surface-active siliceous clay catalyst.

12. The process of preparing compounds having the formula $C_{10}H_{17}-R'-O-CH_2CH_2-O-CH_2CH_2-O-CH_2CH_2Cl$ in which R' is an aryl radical and $C_{10}H_{17}$ is a terpenic hydrocarbon radical, which comprises condensing a compound of the class consisting of terpenic $C_{10}$ alcohols and terpenic $C_{10}$ hydrocarbons with a β-aryloxy-ethoxy-β'-chlorodiethyl ether in the presence of a surface-active siliceous clay catalyst.

13. The process of preparing compounds having the formula $C_{10}H_{17}-R'-O-CH_2CH_2-O-CH_2CH_2Cl$ in which R' is an aryl radical and $C_{10}H_{17}$ is a terpenic hydrocarbon radical, which comprises condensing a compound of the class consisting of terpenic $C_{10}$ alcohols and terpenic $C_{10}$ hydrocarbons with a β-aryloxy-β'-chlorodiethyl ether in the presence of a surface-active siliceous clay catalyst.

14. The process of preparing compounds having the formula $$R—R'—(O—A)_nCl$$

in which R is a cycloaliphatic radical, R' an aryl radical, A is a member of the group consisting of alkylene radicals having at least two carbon atoms and polyalkylene ether radicals in which the alkylene groups contain at least two carbon atoms and $n$ is an integer less than 8, which comprises heating a cycloaliphatic alcohol with a polyalkylene ether chloride $$R'—(O—A)Cl_n$$

in the presence of a surface-active siliceous clay catalyst to temperatures of from about 180° to about 210° C.

15. The process of preparing compounds having the formula $$R—R'—(O—A)_nCl$$

in which R is a cycloaliphatic radical, R' an aryl radical, A is a member of the group consisting of alkylene radicals having at least two carbon atoms and polyalkylene ether radicals in which the alkylene groups contain at least two carbon atoms and $n$ is an integer less than 8, which comprises heating a cycloaliphatic compound containing an olefinic linkage with a polyalkylene ether chloride $R'—(O—A)_nCl$ in the presence of a surface-active siliceous clay catalyst to temperatures of from about 180° to about 210° C.

16. The process of preparing compounds having the formula $$R—R'—(O—A)_nCl$$

in which R is a cycloaliphatic radical, R' an aryl radical, A is a member of the group consisting of alkylene radicals having at least two carbon atoms and polyalkylene ether radicals in which the alkylene groups contain at least two carbon atoms and $n$ is an integer less than 8, which comprises heating a member of the group consisting of cycloaliphatic alcohols and cycloaliphatic compounds containing an olefine linkage with a polyalkylene ether chloride $R'—(O—A)_nCl$ in the presence of a surface-active siliceous clay catalyst to temperatures of from about 180° to about 210° C.

HERMAN A. BRUSON.